Nov. 17, 1964 E. M. BRADLEY 3,157,865

THIN FILM MAGNETIC DEVICES

Filed Sept. 7, 1961

INVENTOR
EDWARD MICHAEL BRADLEY
BY Kane and Nydick
ATTORNEYS

United States Patent Office 3,157,865 Patented Nov. 17, 1964

3,157,865

THIN FILM MAGNETIC DEVICES

Edward Michael Bradley, Stevenage, England, assignor to International Computers and Tabulators Limited, London, England Filed Sept. 7, 1961, Ser. No. 136,630
Claims priority, application Great Britain, Sept. 13, 1960, 31,489/60
6 Claims. (Cl. 340—174)

This invention relates to devices utilising areas of ferromagnetic film as bi-stable elements.

Devices, such as signal storage devices, have been proposed consisting of discrete areas of ferromagnetic film deposited on a substrate, for example, of glass or aluminium. The discrete areas of film each consists of a planar film of anisotropic ferromagnetic material of single domain thickness having two opposite stable states of magnetisation, and which can be switched from one state to the other state by the application of a suitable magnetic field. In the stable states the magnetisation vector is in either of two opposite directions aligned with the so-called "easy" direction of magnetisation. The direction at right angles thereto is known as the "hard" direction. Switching of an area of film can be effected by passing a current through a conductor lying in a plane close to and parallel to the plane of the area of film. Such films, hereinafter referred to as thin ferromagnetic films, may be deposited on the substrate by a vacuum evaporation technique, such as described by M. S. Blois in "The Journal of Applied Physics," volume 26, No. 8, or as described by M. Prutton and E. M. Bradley, Proc. Phys. Soc. (London) 75, 557, 1960. The conductors may be deposited by vacuum evaporation or may be formed by any of the known methods in the art of printed circuit manufacture. Insulating layers to insulate the conductors from one another where they are superimposed and to insulate the conductors from the areas of ferromagnetic film or substrate when the film or substrate are of conducting material may be formed by vacuum evaporation. A suitable insulating material is magnesium fluoride.

It is an object of the invention to provide means for sequential transfer of data from one film element to an adjacent film element. It is a further object of the invention to provide an improved ferromagnetic film device for storing data in which the data can be read out without destruction of the stored data.

Another object of the invention is to provide a shifting register consisting of thin ferromagnetic elements operating as bistable devices.

According to the invention in a magnetic device including an area of magnetic film of single domain thickness having mutually perpendicular easy and hard directions of magnetisation, said area including at least two elements of film for storing data represented by the state of magnetisation of the element, data is transferred from a first element to a second adjacent element by applying a magnetic field to the second element to switch it to the hard direction of magnetisation and subsequently allowing said second element to relax into the easy direction of magnetisation under the influence of the magnetic state of the first element whereby the second element is switched to a magnetic state opposite to that of the first element.

Preferably a magnetic device includes first and second drive conductors extending parallel to one another; an area of magnetic film of single domain thickness having its easy direction of magnetisation parallel to said conductors and its hard direction of magnetisation transverse to said conductors, first and second elements of said area being coupled to the first and second conductors respectively and to one another; means to apply a first current pulse to the first conductor to switch the first element to the hard direction and to apply a second current pulse in overlapping time relation with the trailing edge of the first pulse to the second conductor to switch the second element to the hard direction; means to cause the first element to relax into a selected state on termination of the first pulse whereby on termination of the second pulse the second element relaxes under the influence of the magnetic state of the first element into the opposite state in the easy direction.

According to another aspect of the invention a magnetic device includes a plurality of drive conductors and corresponding elements of an area of film are coupled respectively thereto. Drive current pulses are applied in overlapping time relation to the conductors whereby each element in turn is switched to state dependent on the state of the preceding element.

The invention will be described hereinafter in more detail by way of example with reference to the accompanying drawings in which.

An item of data is represented by the stable magnetic state of an element of magnetic film. This data is shifted from one element to another adjacent element by applying, to said adjacent element, a magnetic field in the "hard" direction of sufficient amplitude to cause the magnetic vector of said adjacent element to rotate into alignment with the "hard" direction. When the applied field is turned off, a very small field aligned with the "easy" direction is capable of influencing the vector during its relaxation into one of its stable states such that the vector relaxes into a stable state determined by the sense of the small easy direction field. In the embodiments described hereinafter this small field in the easy direction is provided by the said one element.

Figures 1, 2:
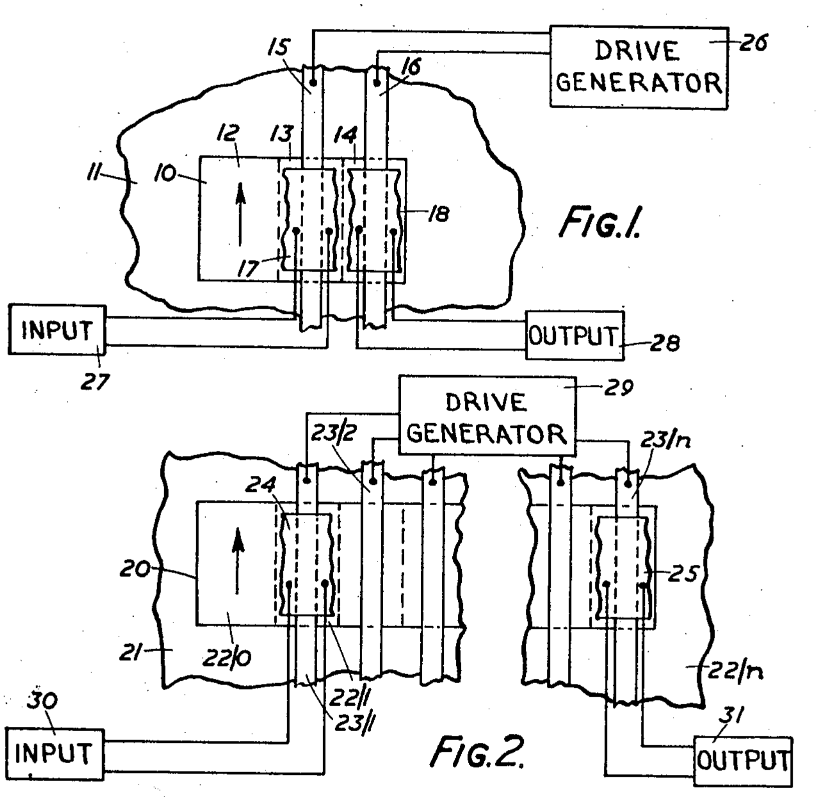
FIGURE 1 shows diagrammatically a ferromagnetic film storage device.
FIGURE 2 shows diagrammatically a shifting register utilising a strip of thin ferromagnetic film.

Referring first to FIGURE 1 an area of thin film 10 is deposited, for example in the manner hereinbefore referred to, on a substrate 11. The area of film is notionally divided into three elements 12, 13, 14. A drive conductor 15 extends, parallel to the plane of the film, across the element 13 and a second drive conductor 16 extends across the element 14, the conductors 15, 16 extending substantially parallel to one another and to the easy direction of the film. A write-in conductor 17 extends at right angles to conductor 15 across the element 13 and a read conductor 18 extends at right angles to drive conductor 16 across the element 14. For clarity only those parts of the conductors 17 and 18 which are magnetically coupled to the film area are shown, the ends of the conductors being led away in such a manner as to have substantially no coupling with the film.

For clarity, the drive conductors 15, 16 are shown of narrower width than the elements 13, 14 whereas in practice the width of each conductor is substantially the same as the width of the associated element since it is the width of the conductor which defines the width of the associated element. Thus the part of the area forming the element 13 is defined by the width of drive conductor 15 and the width of write conductor 17.

Insulating layers are provided where necessary to insulate the conductors from one another and from the film. For clarity the insulating layers are not illustrated.

With no magnetic field applied, the film has two stable states, in each of which states the magnetic vectors of the elements are parallel to the conductors 15, 16. In one state the vector extends in one direction as indicated by the arrow and in the other state the vector extends in the opposite direction.

The element 12, in this embodiment is utilised as a resetting element for the storage device as will be explained hereinafter and therefore this element is not arranged to be switched from one state to the other state but is permanently set in a selected one of the stable states.

Figure 3:
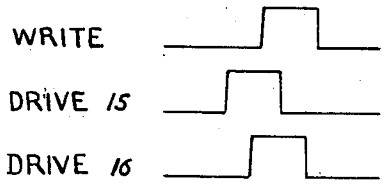
FIGURE 3 shows the timing of pulses applied to conductors of the storage device of FIG. 1.

Data is written into the device by rotating the magnetic vector of element 13 through 90° into alignment with the hard direction and then causing the vector to relax into a state representative of the data being written into the device. The magnetic vector of element 14 also is rotated into the hard direction to prevent the element 14 from influencing the relaxation of element 13. A writing operation is accomplished by the application of drive current pulses from source 26 to the drive conductors 15, 16 to rotate the vectors of elements 13, 14 into the hard direction and by the application of a pulse of suitable polarity from input device 27 to the write conductor 17. The drive pulse in conductor 16 and the write-in pulse in conductor 17 are timed to overlap the trailing edge of the drive pulse in conductor 15 as shown in FIGURE 3. Thus on termination of the pulse in conductor 15, the element 14 is held with its vector in the hard direction so that its influence on the relaxation of element 13 is reduced to a minimum and the write-in pulse in conductor 17 ensures that the vector of element 13 relaxes into the selected state. At the end of the drive pulse in conductor 16, timed to end after the element 13 has relaxed into a stable state, the element 14 relaxes into a stable state under the influence of the external field from element 13 and this element 14 therefore assumes the opposite state to that of element 13.

If the input device 27 is capable of producing write-in pulses in conductor 17 having a polarity dependent on the binary value being entered, data is written into the storage device as described above. However, if the device 27 produces pulses of only one polarity representative of only one binary value, for example binary 1, and zero output for the other value, one value is written in as above and the other value is written in by allowing the element 13 to relax under the influence of the element 12, which is permanently set in the state representative of said other value.

The stored data is read-out from the device by applying a drive pulse only to conductor 16 whereby the vector of element 14 is caused to rotate through 90° from a state representing the stored data into the hard direction. At the end of the pulse, the vector returns to its previous stable state under the influence of the field from element 13. Rotation of the vector of element 14 induces in the read-out conductor 18 voltage pulses of opposite polarity coincident with the leading and trailing edges respectively of the pulse on conductor 16. The polarity of the read-out pulses is dependent on the direction of rotation of the vector.

Thus, a pulse of a polarity dependent on the state of the element is induced in the conductor 18 substantially coincident with the leading edge of the drive pulse and a second pulse of opposite polarity is induced substantially coincident with the trailing edge of the drive pulse. Therefore the polarity sequence of the pair of pulses or the polarity of either one of the pulses in indicative of the data stored by the device.

It will be understood that, since the vector of element 14 relaxes under the influence of the field from element 13 at the end of the read-out, the stored data is not destroyed by reading-out the data.

The method of transferring data from one element to an adjacent element as hereinbefore described in the storage device of FIGURE 1 may be utilised for propagating data along a shifting register consisting of a plurality of magnetic film elements. The register comprises a plurality of elements of magnetic film arranged in line transverse to the easy direction and a plurality of drive conductors extending parallel to the easy direction and coupled one to each element. A series of pulses are applied in overlapping time relation to the conductors such that each element is switched to the hard direction and is allowed to relax in turn into a stable state under the influence of the stable magnetic state of the preceding element, the succeeding element at this time being held in the hard direction by the pulse applied to the corresponding conductor so as to reduce its influence on the relaxing element to a minimum.

In the specification of U.S. Patent No. 3,048,829 there is described a magnetic film storage device in which an element of magnetic film lying between two elements adjacent thereto is switched by fields from the adjacent elements only when both adjacent elements are in the same state. The three elements are disposed in line along the easy direction of magnetisation of the film. Thus in effect the state of the adjacent elements has been transferred to the middle element. This transfer is in a direction aligned with the easy axis and is therefore perpendicular to the transfer of data hereinbefore described.

By providing suitable patterns of conductors a word of selected bits of a word may be shifted in either of two perpendicular directions and logical functions such as "OR," "AND" may be carried out on two or more words by suitable shift operations on the words.

A shifting register consists in the embodiment illustrated in FIGURE 2 of a strip 20 of a film of magnetic material deposited on a substrate 21. The strip is notionally divided along its length into a series of bistable elements **22/0, 22/1 . . . 22/*n*. A series of drive conductors 23/1, 23/2 . . . 23/*n* are provided which extend across the strip 20 and are coupled to elements 22/1 . . . 22/*n* respectively. A write conductor 24 is provided extending across the element 22/1 at right angles to the drive conductor 23/1. A read conductor 25 is provided extending across the last element 22/*n* of the register at right angles to drive conductor 23/*n*. For clarity only those parts of the conductors 24 and 25** are shown which are inductively coupled to the film.

Figure 4:
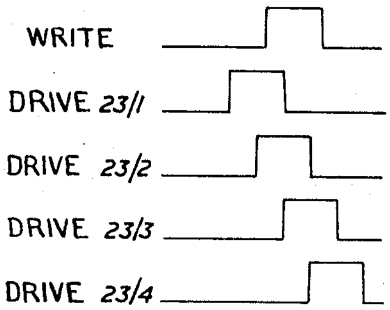
FIGURE 4 shows the timing of pulses applied to conductors of the shifting register of FIG. 2.

A word consisting of a number of binary bits is entered into the register serially bit by bit, each bit being written in element 22/1 and then propagated along the shifting register. The bits are written into element 22/1 in a similar manner to writing a bit into the above described storage device. A drive generator 29 applies a drive pulse to conductor 23/1 to rotate the vector of element 22/1 through 90° into the hard direction and a delay pulse to conductor 23/2 to rotate the vector of element 22/2 through 90° into the hard direction. A pulse of which the polarity represents a binary bit is applied to the write conductor 24 by input device 30 to cause the vector of element 22/1 to relax on termination of the pulse on conductor 23/1 into state representing the bit being entered. At this stage, element 22/1 is set in the selected state and element 22/2 is in an unstable state with the vector in the hard direction. The bit now stored in element 22/1 is propagated along the register by applying from generator 29 a current pulse to conductor 23/3 such that element 22/3 has its vector in the hard direction at the time of the end of the pulse on conductor 23/2. Thus element 22/2 relaxes to a stable state under the influence of the magnetic state of the element 22/1. Similar pulses delayed with respect to one another as shown in FIGURE 4 are applied to sufficient of the remaining conductors to shift the bit to the desired position in the register.

It will be appreciated that since each element relaxes into a state opposite to that of the preceding element, a particular binary value will be represented by alternate states on alternate elements, i.e. by one state on even numbered elements and by the opposite state on odd numbered elements.

If the input device 30 generates a pulse of one polarity representing one binary value and zero output represents the other binary value, the element 22/0 is set permanently to represent the other value and is utilised to write in said other value. However, if pulses of opposite polarities are generated for the two values respectively the element 22/0 is not provided.

The succeeding bits of the word are entered into the register in a similar manner by writing each in turn on element 22/1 and propagating them along the register in succession. Succeeding bits cannot be entered until the preceding bit or bits have been propagated such as a distance along the register that the entry of the bit does not interfere with the bit immediately preceding it. For instance with drive pulses as shown in FIGURE 4, a second bit cannot be entered before the time at which the pulse indicated as drive 23/4 is applied to the conductor (not shown) which is next after conductor 23/3.

The bits of the word are read out in turn from the register as they reach the last element **22/*n* by voltage pulses induced in the read conductor 25**. If desired additional read conductors may be provided on selected other elements of the register whereby the bits may be read out as they pass each selected element in spaced time intervals.

The direction in which the bits are propagated is dependent on the order of pulsing the drive conductors. Thus if desired the bits may be propagated in a reverse direction along the register. After entry of a word into the register, a part of it may be propagated leaving the remainder stationary in the register by pulsing only those drive conductors corresponding to the elements in which the bits to be propagated are held.

The register may be constructed in the form of a cylinder with the end elements 22/1 and **22/*n* adjacent one another. In this case element 22/0** would not be provided. Thus a word entered in the register may be circulated around the register and read out at any desired point by a read conductor coupled to the desired element.

A number of registers may be operated in parallel with a series of common drive conductors and each provided with a write and a read conductor. The parallel registers may be arranged to extend side by side and the film may then be a continuous area, each register strip 20 being a strip-like portion of the area of film. To prevent interaction between the elements of adjacent registers, the strips are spaced apart and the common drive conductors are arranged to be magnetically coupled only to those areas of film comprising the strips 20. Additional conductors extending along each register, i.e. perpendicular to the drive conductors, may be provided whereby a word or bits of a word entered in one register may be shifted into an adjacent register, shifting in this direction being accomplished by switching of elements due to their interpositions between two elements in the same stable state, elements between two elements in opposite states remaining unswitched.

I claim:

1. A magnetic device including first and second drive conductors extending parallel to one another; an area of magnetic film of single domain thickness having its easy direction of magnetisation parallel to said conductors and its hard direction of magnetisation transverse to said conductors, first and second elements of said area being coupled to the first and second conductors respectively and to one another; means to apply a first current pulse to the first conductor to switch the first element to the hard direction and to apply a second current pulse in overlapping time relation with the trailing edge of the first current pulse to the second conductor to switch the second element to the hard direction and means to cause the first element to relax into a selected state on termination of the first pulse whereby on termination state of the second pulse the second element relaxes under the influence of the magnetic state of the first element into the opposite state to that of the first element.

2. A magnetic device including a series of substantially co-planar parallel drive conductors; a planar area of magnetic film of single domain thickness disposed adjacent said drive conductors and having an easy direction of magnetisation parallel to the conductors and a hard direction of magnetisation transverse to the conductors, a series of elements of said area of film being coupled one to each drive conductor and adjacent elements in the series being mutually coupled; means to apply a drive pulse to each of the drive conductors to switch the element coupled thereto into the hard direction, the timing of the pulses being such that the pulse applied to a conductor is in overlapping time relation with the trailing edge of the pulse applied to the preceding conductor in the series, and means to cause a selected element to relax into a selected stable state on termination of the pulse applied to the corresponding conductor whereby succeeding elements in the series relax in sequence to a stable state dependent on the stable state of the preceding element.

3. A magnetic device including first and second drive conductors extending parallel to one another; an area of magnetic film of single domain thickness having an easy direction of magnetisation parallel to said conductors and a hard direction of magnetisation transverse to said conductors, first and second elements of said area being coupled to the first and second conductors respectively and to one another, said elements each having two stable magnetic states in which the magnetisation is aligned with the easy direction; means to apply a first current pulse to the first conductor to switch the first element to the hard direction and to apply a second current pulse in overlapping time relation with the trailing edge of said first current pulse to the second conductor to switch the second element to the hard direction; a third conductor coupled to the first element and extending transverse to the easy direction; and means to apply a write-in current pulse to the third conductor in overlapping time relation with said first current pulse to cause the first element to relax into a selected one of its stable states on termination of said first pulse whereby on termination of the second pulse the second element relaxes under the influence of the stable magnetic state of the first element into the opposite stable state to that of the first element.

4. A magnetic device including a plane area of magnetic film of single domain thickness having mutually perpendicular hard and easy directions of magnetisation in the plane of the film; first and second elements of said area magnetically coupled to one another and each having two stable states in which the magnetisation is aligned in the easy direction; a third element magnetically coupled to said first element and set to one stable state with its magnetisation in the easy direction; a first drive conductor coupled to said first element and extending in the easy direction; a second drive conductor coupled to said second element and extending in the easy direction; means to apply a current pulse to the first conductor to switch the first element to the hard direction and to apply a second current pulse in overlapping time relation with said first current pulse to said second conductor to switch the second element to the hard direction whereby on termination of the first current pulse the first element relaxes into the opposite stable state to that of the third element and on termination of the second current pulse the second element relaxes into the opposite stable state to that of the first element.

5. A magnetic device as claimed in claim 4 and including a third conductor coupled to said first element and extending transverse to the easy direction and input means selectively operable to apply a current pulse in overlapping time relation with the trailing edge of said first pulse to cause the first element to relax into the same stable state as the third element.

6. A magnetic device including a series of substantially coplanar parallel drive conductors; a planar area of magnetic film having single domain characteristics providing mutually perpendicular hard and easy directions of magnetisation, said area providing a series of elements of film each coupled to a separate one of said drive conductors respectively and adjacent elements being mutually coupled, each element having two stable magnetic states in which the magnetisation is aligned in the easy direction, in one state in one direction and in the other state in the opposite direction, and a selected one of said elements in the series being set to a selected one of said states; means to apply a drive pulse to each of a group of said drive conductors, said group comprising a succession of said drive conductors starting at that drive conductor immediately succeeding the drive conductor coupled to the selected element, the trailing edge of the pulse applied to each conductor occurring during the period of the pulse applied to the next succeeding conductor of the group.

References Cited in the file of this patent

UNITED STATES PATENTS 2,919,432 Broadbent ------------- Dec. 29, 1959
3,030,612 Rubens et al. ----------- Apr. 17, 1962
3,058,099 Williams ----------------- Oct. 9, 1962

FOREIGN PATENTS 1,189,226 France ------------------- July 4, 1960
845,605 Great Britain ----------- Aug. 24, 1960